Jan. 2, 1962     D. N. OBENSHAIN     3,015,230
WET WEB TENSILE TESTER
Filed Nov. 5, 1957     4 Sheets-Sheet 1
FIG. I.
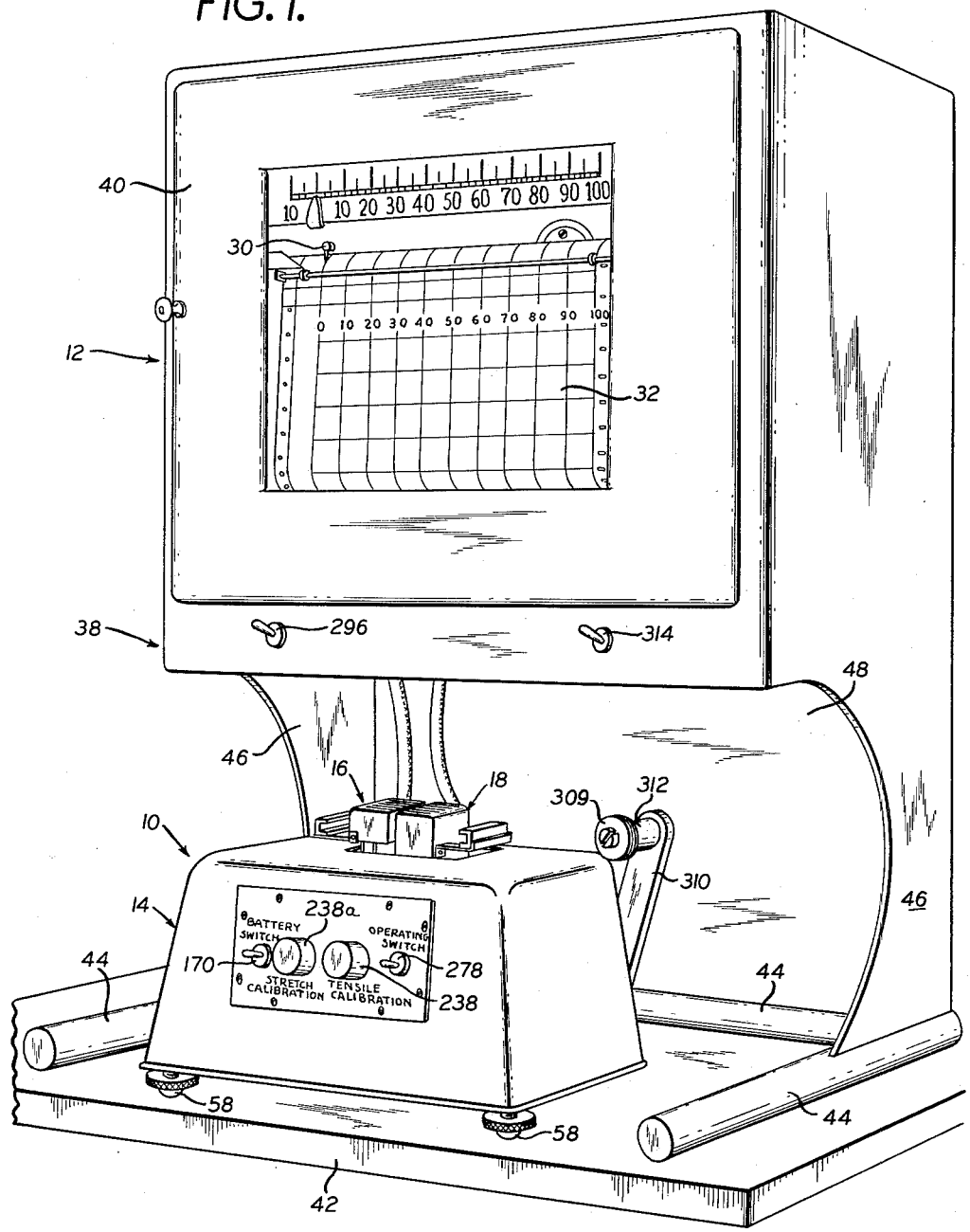
INVENTOR
DAVID NOEL OBENSHAIN
BY
*Berry † Crews*
ATTORNEYS.

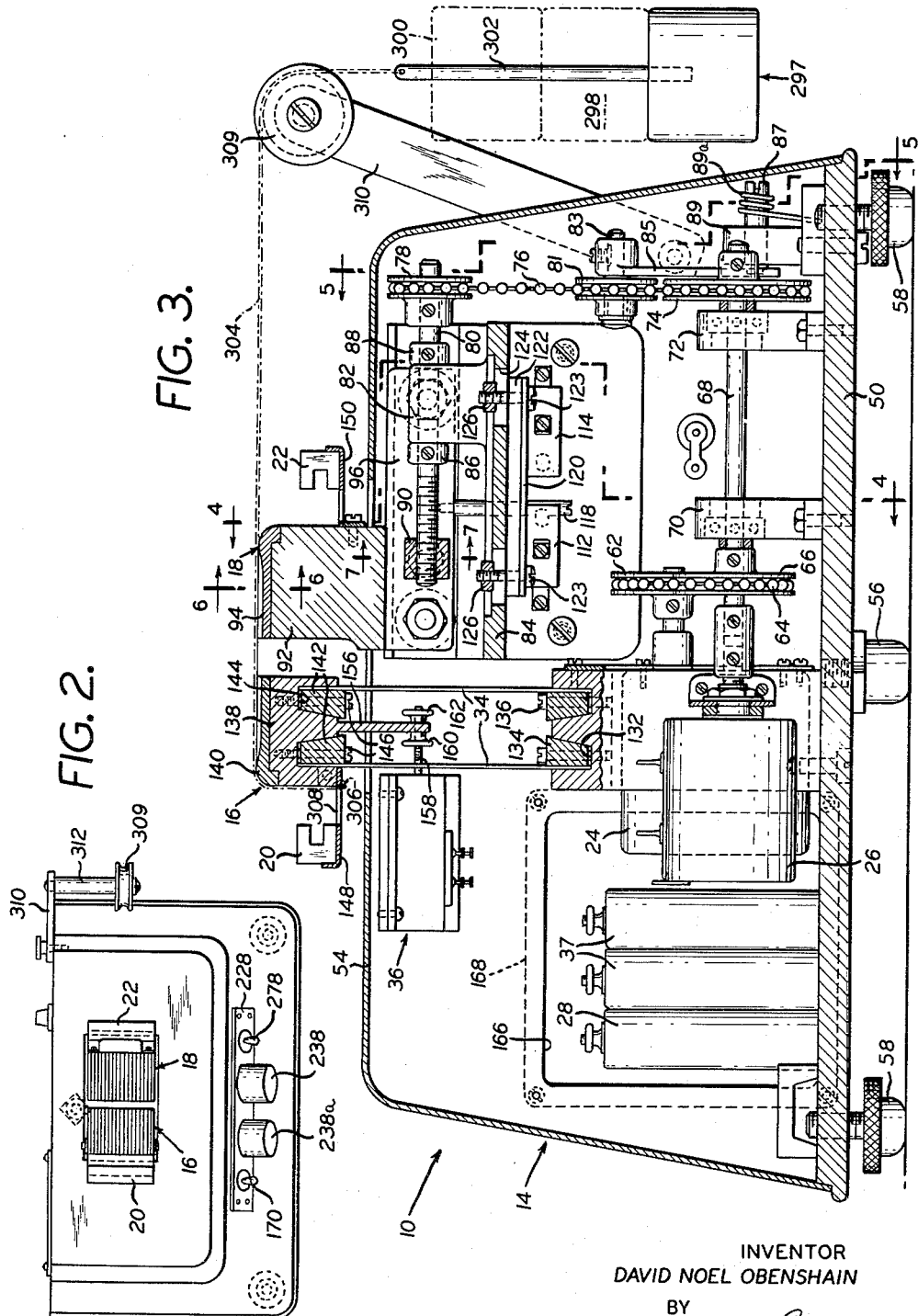

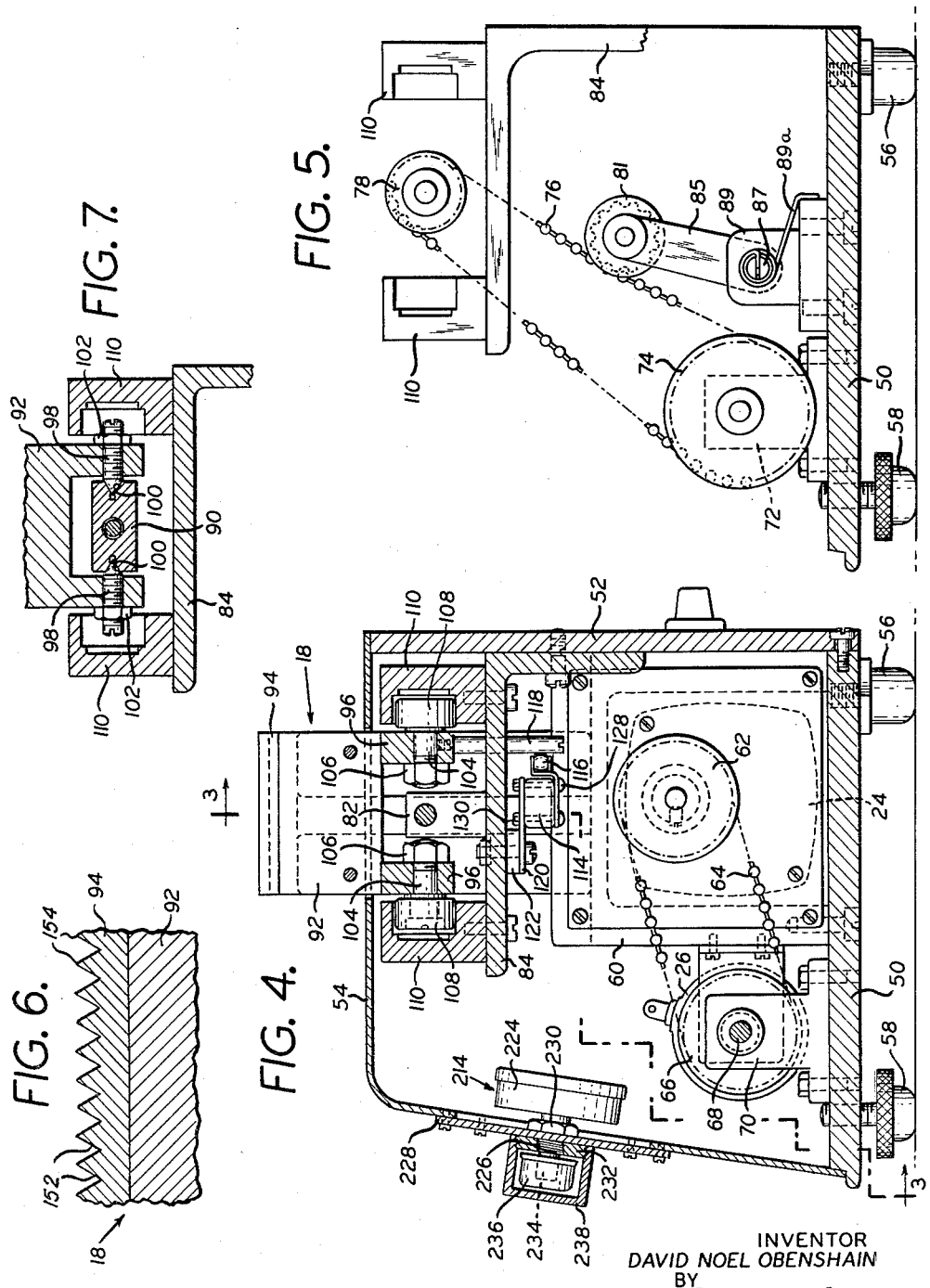

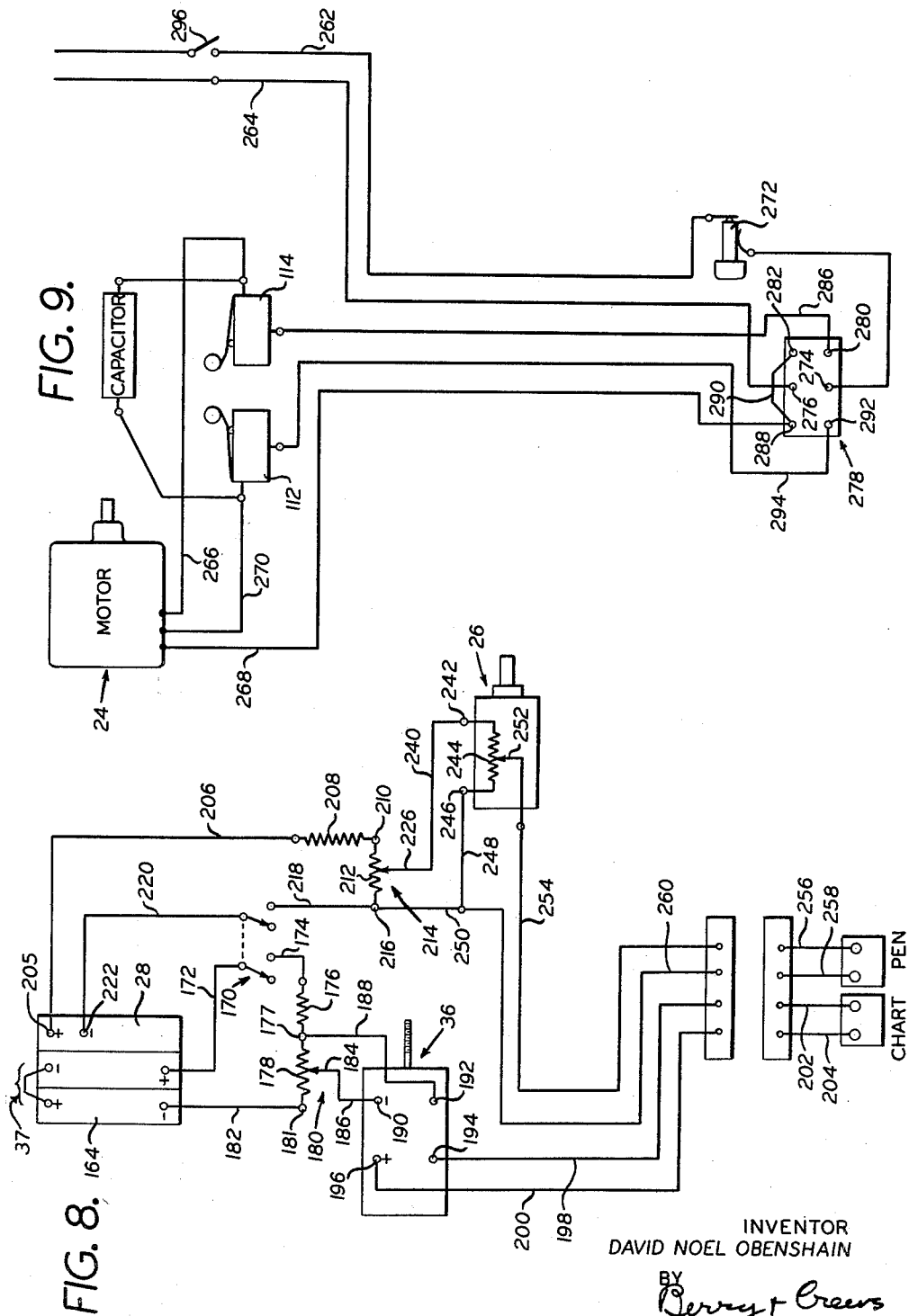

United States Patent Office 3,015,230
Patented Jan. 2, 1962

3,015,230
WET WEB TENSILE TESTER
David Noel Obenshain, Luke, Md., assignor to West Virginia Pulp and Paper Company, New York, N.Y., a corporation of Delaware
Filed Nov. 5, 1957, Ser. No. 694,558
8 Claims. (Cl. 73—89)

This invention relates to means for testing the stretchability and the tensile strength of very weak webs, and particularly of wet paper webs in a state of partial manufacture.

Wet web strength is a matter of importance, not only from the standpoint of the ability of the web to withstand tensile stresses during manufacture, but also from the standpoint of the structure of the final web and the interfiber relationships of that structure.

It is characteristic of instruments for determining the tension-stretch relationship of wet webs, and/or the tension at rupture, that a sample is secured at opposite ends to relatively fixed and movable sample supports, that the supports are relatively moved to stretch the sample and to put the sample under tension, and that means are provided for indicating respectively the tension and the stretch of the sample.

Prior instruments devised for this purpose are of two classes: (1) a known tension is applied to the test sample and the resulting stretch is measured, and (2) a known stretch is applied to the sample and the resulting tension is measured.

An example of a testing instrument of the first class is shown and described in an article by Lyne and Gallay entitled "Measurement of Wet Web Strength," which appeared at pages 135–138 of the October 1954 issue of "Pulp and Paper Magazine of Canada." In the instrument described by Lyne and Gallay a stress is applied to the movable sample support through a chain-o-matic drive. The weight of chain fed out is taken as a measure of the tension applied to the paper, notwithstanding the fact that the transmission of the force to the movable sample support is effected through mechanism which may consume some of the measured force in friction.

The movable sample support, moreover, forms part of a ponderous head which is pendulously supported. The head involves inertia and gravity effects, and must swing through an arc substantially equal in extent to the total elongation of the paper. The head, therefore, introduces tension effects which are not compensated in the chain-o-matic measurements, because it at times assists and at times opposes the movement of the movable support away from the relatively fixed support.

The chain-o-matic method of loading and the pendulous method of mounting the movable support have the further disadvantage that the loading cannot be reduced below a pre-determined, quite substantial minimum in the initial or sample loading position. The result is that the fixed and movable supports must be clamped against relative movement while the sample is being applied, and this measure of loading is abruptly applied to the paper sample through the movable support as the movable support is unclamped.

In the Lyne and Gallay tester the sample ends are wrapped around rounded corners of the sample supports and are clamped against vertical walls of the support. The supports are initially brought close together so that the stretchable length of the sample is almost continuously horizontally supported, thus avoiding the likelihood both of slack and of pre-stretching. This is advantageous. The wet sample, however, tends to adhere to the flat horizontal faces of the supports by friction and by suction, so that an abnormal or extraneous resistance to elongation is maintained in the supported areas of the sample, the only portion of the sample which can stretch freely being the short portion, if any, which initially bridged the space between the supports. The even distribution of stretch throughout the stretchable length of the sample is greatly interfered with. In fact, the stretchable length of the sample is not clearly defined so that the basis for percentage calculations is uncertain.

In all other web testing instruments with which I am familiar either the sample hangs vertically and is pre-stretched by its own weight, or the sample initially extends freely over a substantial horizontal span between two relatively movable supports, being clamped to the supports immediately adjacent end portions of the free stretchable length of the sample. The presence of a long, free, unsupported length in a horizontally disposed sample inevitably leads to the presence of slack and/or of pre-stretching. The clamps, moreover, squeeze an abnormal amount of water from the clamped areas into the end portions of the unclamped stretchable sample length, making the end portions more stretchable and of less tensile strength than the portions of the sample not so weakened. All this tends to produce erratic and undependable test results.

In testing instruments of the second class provision is made of manually operable means for driving a first sample support or clamp away from a second sample support or clamp. One objection to this arrangement is that the driving speed is neither predetermined nor uniform. Restoration of the parts to initial position after a test has been completed, moreover, must be tediously effected by manual operation.

The second clamp is not held stationary, but is made movable through a range which represents a very substantial fraction of the total extent of movement of the first clamp, in order that continuous movement may be imparted against a progressively increasing resistance to a tension indicator, while making the movement of the indicator sufficient in extent to afford a clear and precise scale reading.

Instruments of this kind have the advantage that friction in the input drive is relatively unimportant because the input force is designed merely to produce movement of the first clamp and is not measured. They are subject to various drawbacks, however, including friction involved in the travel of the second clamp, friction involved in the transmission train from the second clamp to the tension indicator, inertia of the second clamp and the associated indicator, and indicator rebound at rupture of the sample, or inadequately exact retention of the tension indication after rupture.

It is the purpose of the present invention to provide a compact, efficient and dependable measuring instrument for testing the tensile strength of webs and determining the tension-stretch relation, of such character that all the foregoing drawbacks and disadvantages are avoided or overcome. The novel measuring instrument is advantageous'y of the type in which a predetermined stretch is applied to the web and the resulting web tension is simultaneously measured and coordinately recorded.

It is a feature of the invention that the tension is measured through the medium of a strain gauge in combination with a strain gauge-connected, relatively stationary sample support whose movement is substantially frictionless, minute in extent and free from inertia effects, and means for deriving from the strain gauge a conveniently readable output movement which is a linear function of the movement of the relatively stationary sample support but is greatly amplified with respect thereto.

It is a further feature of the invention that the sample supports are constructed and arranged to define with substantial exactness a freely stretchable sample length, most of which is initially supported horizontally by the supports, while clamping the sample ends well back from the stretchable length. To this end the sample supports are provided with vertical and horizontal faces which are connected through rounded corners, the arrangement being such that the sample ends are clamped against the vertical faces and are snubbed around the rounded corners, and the horizontal stretchable length is substantially continuously supported on ridged surfaces which leave such length substantially free to stretch without opposition caused by frictional and suction effects.

Other objects and advantages will hereinafter appear.

In the drawing forming part of this specification:

FIGURE 1 is a perspective view of a self-contained measuring instrument illustrative of the invention, the instrument being shown operatively connected to a standard X—Y recorder;

FIGURE 2 is a plan view of the measuring instrument of FIGURE 1;

FIGURE 3 is a sectional view of the same measuring instrument, the section being taken upon the irregular line 3—3 of FIGURE 4, looking in the direction of the arrows;

FIGURE 4 is a sectional view of the same measuring instrument, the section being taken on the line 4—4 of FIGURE 3, looking in the direction of the arrows;

FIGURE 5 is a detailed sectional view taken on the line 5—5 of FIGURE 3, looking in the direction of the arrows;

FIGURE 6 is a fragmentary sectional view taken on the line 6—6 of FIGURE 3, looking in the direction of the arrows;

FIGURE 7 is a fragmentary sectional view taken on the line 7—7 of FIGURE 3, looking in the direction of the arrows;

FIGURE 8 is an electrical diagram showing the electrical measuring circuits of the measuring instrument; and FIGURE 9 is an electrical diagram showing the power circuit of the measuring instrument.

In order that a comprehensive view may be had of the novel measuring instrument 10 and of its operative relation to a standard recorder 12, the structure will be first briefly described by reference only to the principal parts, and without attention to detail.

The measuring instrument 10 is chiefly enclosed in a housing 14, but it includes accessible paper sample supports or anvils 16 and 18 which protrude beyond the upper wall of the housing. The supports 16 and 18 are normally disposed at a predetermined distance from one another and are adapted to have the opposite ends of a wet paper sample of predetermined width laid across their tops and wrapped around to lie against their outer end faces. The respective ends of the sample are clamped against the outer end faces of the supports 16 and 18 by magnets 20 and 22, the sample being caused to bridge the normal gap between the supports without substantial slack but without being placed under tension.

Provision is made for a reversible motor 24 (desirably a Bodine motor) which is operable at a very slow speed (in the illustrative instance at 9.3 r.p.m.) and which is connected through bead chains and bead chain pulleys to drive the support 18 away from the support 16 during a test, and, in response to manual switch operation, to restore the support 18 to a normal position at a predetermined distance from the support 16 after the test has been completed. During the test the travel of the support 18 is proportional to, and is nearly equal to, the amount that the paper sample is stretched up to the time when it breaks.

The motor 24 is also connected to drive the rotor of a helical potentiometer 26 in proportion to the travel of the support 18. The potentiometer controls the output voltage from a constant D.C. source (battery 28) to the recording instrument 12.

The instrument 12 is desirably a well known standard Brown X—Y recorder. This instrument includes a pen 30 which is moved horizontally across a chart 32 by well known means in proportion to the input voltage furnished through the potentiometer 26. The movement of the pen is directly proportional to the travel of the support 18, and is therefore directly proportional to the stretch of the paper up to the point at which the paper breaks. After the paper breaks the travel of the pen continues until the motor 24 is arrested by the opening of a limit switch.

The support 16, while relatively stationary as compared with the support 18, does move a small but important amount in response to the tension applied through the paper sample from the support 18. The support 16 is mounted on the upper ends of four parallel leaf springs 34 which flex slightly under the tension applied through the paper to permit the support 16 to be displaced in proportion to the tension under which the sample is put by the travel of the support 18. The displacement of the support 16 is utilized to control a strain gauge 36. The extension of the strain gauge is constantly equal to the displacement of the support 16 from its normal position.

The strain gauge is so designed, and is so connected in its circuit, that a variable output voltage is caused to be transmitted from a constant D.C. source 37 to the standard Brown recorder, the arrangement being such that the output voltage varies with the web tension. The output voltage referred to is utilized in the Brown recorder to control a balancing motor (not shown), and thereby to control the drive of the chart 32. As the tension on the paper sample is increased the voltage output controlled by the strain gauge is proportionally increased, causing the balancing motor to advance the chart in proportion to the output voltage of the strain gauge until the sample breaks. Upon the breaking of the sample, the strain gauge returns to the normal, unstressed condition, the strain gauge voltage output returns to zero, the balancing motor is reversed, and the chart is returned to the starting position.

When the chart is reversed as a result of the sample breaking, the motor 24 continues the advance of the pen across the chart until the motor 24 is arrested by the opening of a normally closed limit switch. This causes the track traced by the pen on the chart to return to the zero tension line on the chart, but in a zone of the chart not previously traversed by the pen.

As will be pointed out more fully in connection with the detailed description, the ratio of chart movement to sample tension can be adjusted as desired, and the ratio of pen movement to sample stretch can be adjusted as desired, simply by altering to any desired extent the settings of normally fixed potentiometers which are included in the respective measuring circuits of the measuring instrument 10.

Referring first to FIGURE 1, it will be noted that the mechanism which forms the recorder 12 is housed in a cabinet 38 having a hinged transparent door 40. The enclosing comparent of the cabinet 38 is supported considerably above a shelf 42 through bottom arms 44 which rest upon the shelf, and side and rear walls 46 and 48 which form part of the cabinet. Since the recorder 12 is in all respects of standard and well known construction the details of the operating mechanism which it comprises will not be further described.

The measuring instrument 10 is shown as placed upon the shelf 42 in a recess formed by the cabinet 38, although this relationship is not essential. The housing 14 of the instrument 10 comprises a base 50, together with a rear wall 52 and a cover 54 which are detachably secured to the base 50. The base 50 serves as the primary support for the framework and the operating mechanisms which constitute the instrument 10. The base 50 is equipped along its rear margin with fixed feet 56, and along its front margin with leveler feet 58.

The motor 24 is carried from a hollow bracket 60. The output shaft of the motor 24 has fast upon it a bead chain pulley 62, which, through a bead chain 64, drives a bead chain pulley 66 fast on the rotor shaft 68 of the helical potentiometer 26. The shaft 68 is rotatably supported in bearings 70, 72, and has fast upon its end remote from the potentiometer 26 a bead chain pulley 74. The pulley 74 is connected through a bead chain 76 to drive at twice its own rotary speed a smaller bead chain pulley 78 which is fast on a feed screw 80. In the illustrative case the potentiometer 26 is a ten turn, one thousand ohm potentiometer, and the feed screw 80 is caused to be driven two turns for each turn of the potentiometer, or a total of twenty turns for the full range of he potentiometer.

An idler pulley 81 is spring urged against the rear run of the chain 76 for taking up slack of the chain. This is important because it eliminates lost motion between the potentiometer and the movable sample support 18, as will presently become apparent. The pulley 81 is rotatively supported on a bearing pin 83 which is carried by a swingable arm 85. The arm 85 is fast on a pivot pin 87 which is journalled in a stationary bracket 89. A spring 89a constantly urges the pin 87 in a direction and with a force to press the pulley 81 firmly against the chain 78.

The feed screw 80 is rotatably supported in a bearing block 82, the block being secured in fixed position upon a stationary shelf bracket 84. Collars 86 and 88 are affixed to the feed screw 80 at opposite sides of the bearing block 82 to prevent axial movement of the feed screw 80 while permitting it to rotate. The feed screw 80, at its end remote from the pulley 78, is provided with threads (illustratively 20 threads to the inch) and is screwed through a feed nut 90, the feed nut being mounted for movement in unison with the movable sample support 18. As will be seen in FIGURE 3, the movable sample support 18 includes a steel block 92 and a stainless steel top plate 94. The block 92 includes at its lower end extended, spaced, parallel flanges 96 through each of which a cone tipped bearing screw 98 is threaded. The tips of the bearing screws 98 fit into aligned conical recesses 100 which are formed in the opposite sides of the feed nut 90. Lock nuts 102 are provided for securing the screws 98 in a relation to the feed nut 90 and to one another, such that the feed nut is free to turn about the bearing screw axis for adjusting itself to irregularities of the feed screw 80, but is held against bodily movement relative to the block 92. Each flange 96 provides support for two headed, shouldered and threaded bearing studs 104 which are secured in place by nuts 106. Rolls 108, rotatably mounted on the studs 104, are supported and guided in parallel channel bars 110, the channel bars being supported upon, and affixed to, the shelf bracket 84.

Limit switches 112 and 114, desirably of the snap acting toggle type, serve automatically to de-energize the motor 24 at selected limits of movement. Each of the switches is provided with an actuator 116. Each switch is of the normally closed type. A switch operating rod 118 affixed to one of the flanges 96 of the block 92 engages the actuator 116 of the switch 112 to open the switch 112 and thereby arrest leftward or return movement of the movable sample support 18. The switch 112 is held open by the rod 118 until the motor is started in the opposite direction by manual switch control to carry the sample support 18 and the rod 118 toward the right. The rod 118 engages the actuator 116 of the switch 114 to open the switch 114 and thereby arrest rightward or active movement of the movable sample support 18. The switch 114 is held open by the rod 118 until the motor is started by manual switch control to carry the sample support 18 and the rod 118 toward the left. The circuit arrangement will be more fully described and explained at a subsequent point.

The switches 112 and 114 are adjustably mounted on a plate 120 which is made unitary with a rigid spacer bar 122. The plate 120 and the spacer bar 122 are adjustably secured at the lower side of the shelf bracket 84 by means of headed screws 123 whose shanks are passed freely upward through the plate 120 and the spacer bar 122, and are thence continued upward through slots 124 of the shelf bracket 84. The screws 123 are drawn upward forcibly by nuts 126. Each of the switches 112 and 114 is similarly adjustably secured to the plate 120 by screws 128 whose shanks are passed upward through the switch bodies and then through slots formed in the plate 120, the screws being forcibly drawn upward by nuts 130.

As has been mentioned, the movable support 16 is jointly carried by the upper ends of four parallel leaf springs 34. Each spring 34 has its lower end received in a tapered socket 132 of the rigid, stationary bracket 60. A slotted wedge block 134 is inserted in each socket alongside the associated spring 34 and is forced into the socket by a headed screw 136 for clamping the associated spring 34 firmly in its assigned position against a vertical wall of the socket.

The relatively stationary sample support 16 is composed of a steel block 138 and a stainless steel top plate 140. The upper ends of the springs 34 are firmly secured in the block 138 in the same manner that the lower ends of the springs are secured in the stationary supporting bracket 60, by forcing slotted wedge blocks 142 into tapered sockets 144 by means of headed screws 146. The leaf springs 34 have their thickness dimensions disposed in the direction in which the movable support is caused to travel, and their widths disposed at right angles to that direction.

The relatively stationary and movable sample supports 16 and 18 are provided, respectively, with supporting extensions 148 and 150 for the magnets 20 and 22. These supports carry the magnets spaced outward from the associated blocks when the magnets, as shown, are inactive. When one end of the paper sample has been placed against the left-hand face of the steel block 138 the magnet 20 is slid in toward the block 138 and is caused to clamp the paper end by the magnetic attraction of the magnet and the steel block for one another. When the opposite end of the paper sample has been similarly placed against the outer face of the block 92 the magnet 22 is similarly slid inward and caused to clamp the paper.

The stainless steel top plates 94 and 140 are rounded at their upper outer corners so that the paper will be subjected to a snubbing action in the transition zones between the vertical and horizontal paper segments, but will not be creased and possibly weakened by a too abrupt turning. Each top plate is formed in its upper face with alternate channels 152 and ridges 154 (FIGURE 6) which extend parallel to the direction of the pull exerted on the paper. This arrangement holds the friction on the paper to a minimum without permitting it to sag, and at the same time prevents the development of any suction effect between the paper and the top plates which might interfere with the normal stretching of the paper. The form of the top plate is such that the stretch of the paper may occur freely in the region between the outer ends of the channeled areas of the top plates but is substantially confined to that region. The percentage of stretch at any given tension may therefore be accurately determined from the measurements which are made.

The block 138 of the relatively stationary sample support 16 includes a downwardly extending arm 156 through which tension is put upon the variable resistor element of the strain gauge 36. The strain gauge includes a threaded rod 158 which is passed freely through the arm 156. Nuts 160 and 162, threaded on the rod 158, may be adjusted into clamping engagement with opposite faces of the arm 156, to cause the rod 158 to move in unison with the arm 156. Care should be taken in tightening the nut 160 and 162 to avoid putting the strain gauge under any initial strain. In the illustrative embodiment of the invention the total movement of the arm 156 never exceeds .0015 inch. That movement is sufficient to operate the strain gauge as required. The strain gauge here employed may not safely be used for measuring tension in excess of 48 ounces, although similar gauges up to 80 ounces or more may be used when required.

As has been pointed out, signal current for measuring the tension is supplied from a battery 37. This battery desirably consists of two 7½ v. dry cells 164 connected in series. The battery 28 consists of a single dry cell. The several dry cells are placed within the housing 14 of the measuring instrument 10 through an opening 166 which is formed in the back wall 52 of the housing. A removable closure plate 168 is provided for normally covering the opening 166.

The signal circuits for the measuring instrument 10 are illustrated in FIGURE 8. Both signal circuits are arranged to be rendered active and inactive in unison with one another by a manually operable, double pole, double throw switch 170. The battery 37, consisting of the two cells 164 connected in series, is connected through a conductor 172, switch 170, a conductor 174, and a fixed resistor 176 to a terminal 177 of a two thousand ohm resistor 178 which forms part of a manually adjustable potentiometer 180. The opposite terminal 181 of the resistor 178 is connected to the second terminal of the battery 37 through a conductor 182. The movable contact 184 of the potentiometer 180 is manually set to secure a desired calibration as will be explained at a subsequent point.

The movable contact 184 and the terminal 177 are connected, respectively, through conductors 186 and 188 to the input terminals 190 and 192 of the strain gauge 36. The strain gauge is not illustrated in detail because it is a familiar and well known unit. It may desirably take the form of a normally balanced Wheatstone bridge having the tension distortable variable resistor elements thereof included in its arms. There is normally no output voltage from the strain gauge, but as the tension on the distortable variable resistors develops and is increased there is a progressively increasing output voltage through output terminals 194 and 196 to conductors 198 and 200. The conductor 198 is connected to an input conductor 202 of the recorder 12 and the return conductor 204 of the recorder 12 is connected to the conductor 200. The internal arrangement of the recorder 12 is not shown and will not be further described because the recorder is of well known construction and does not, per se, form a feature of the present invention.

One terminal 205 of the battery 28 is connected through a conductor 206 and a fixed resistor 208 to one terminal 210 of a one thousand ohm resistor 212 of a manually settable potentiometer 214. The opposite terminal 216 of the resistor 212 is connected through a conductor 218, switch 170, and conductor 220 to the second terminal 222 of the battery 28.

The potentiometer 214 includes a casing 224 (FIG. 4) in which the resistor 212 and the movable contact 226 of the potentiometer are housed. The casing 224 includes a hollow threaded stem 226 which is passed freely through a removable casing panel 228. Nuts 230 and 232, threaded on the stem 226, are adjusted into panel clamping relation against the inner and outer faces of the panel 228. The movable contact 226 is carried on a rotary shaft 234 which extends outward through the hollow stem 226 and which is provided with an operating knob 236. The nut 232 is threaded externally as well as internally. A cap 238 is normally screwed on to the nut 232 to cover the knob 234 and shield it against accidental or unauthorized operation, so that the intended setting will not be disturbed. The housing, mounting operating and shielding of the potentiometer 214 are duplicated for the potentiometer 180. The duplicate structure is only partially illustrated, but such of the parts as as shown are marked with corresponding reference numerals having the subscript *a* added.

The movable contact 226 of potentiometer 214 is connected through a conductor 240 to one terminal 242 of a ten turn, one thousand ohm electrical resistor 244 which constitutes the variable resistance element of the potentiometer 26. The opposite terminal 246 of the resistor 244 is connected to the terminal 216 through conductors 248 and 250. The movable contact 252 of the potentiometer is carried on the shaft 68 and is operated by the motor 24 in the manner heretofore described. The output voltage of the potentiometer 26 is obviously a function of the position of the movable contact 252 relative to the resistor 244, and is a function of the extent to which the paper has been stretched until the point is reached at which the paper breaks.

The movable contact 252 of the potentiometer 26 is connected through a conductor 254 to an input conductor 256 of the recorder 12, and a return conductor 258 of the recorder is connected through a conductor 260 to the conductor 250.

The power circuit for the motor 24 is illustrated in FIGURE 9. The motor wiring is such that the motor will be caused to operate in a forward direction when the connection through the motor field from the hot wire 262 to the ground wire 264 of a two wire A.C. power circuit can be traced from a conductor 266 to a conductor 268, and will be caused to operate in a reverse direction when the connection through the motor field from the hot wire 262 to the ground wire 264 can be traced from a conductor 270 to the conductor 268.

The conductor 262, which is the hot wire and which includes a fuse 272, runs to a terminal 274, while the conductor 264, which is the ground wire, runs to a terminal 276. The terminals 274 and 276 are fixed terminals of a three position, double pole, double throw switch 278. The center position of the switch 278 is the "off" position. When the switch 278 is operated to connect the terminal 274 with a terminal 280 and the terminal 276 with a terminal 282, the motor 24 is caused to operate in a forward direction. The operating circuit may be traced from terminal 280 through a conductor 286, limit switch 114, conductor 266, motor 24, conductor 268, terminal 288 and conductor 290 to terminal 282. Since the forward drive of the motor would be started with the sample support 18 and the rod 118 at their left-hand limits of movement, the limit switch 112 would be open at the outset, and the switch 114 would be closed as required. As the rod 118 travels toward the right it first moves out of engagement with the actuator 116 of switch 112, permitting the switch 112 to assume its normally closed condition. The switch 112 is not rendered active, however, because the position of the switch 278 causes the circuit of which it is adapted to form a part to be incomplete at this time. The continued travel of the rod 118 carries the rod into engagement with the actuator 116 of the switch 114, causing the switch to be open and the operating circuit to be broken.

When a test has been completed and it is desired to return the sample support 18 and the rod 118 to the original or normal position, the switch 278 is operated to connect terminal 274 with a terminal 292 and the terminal 276 with the terminal 288. The operating circuit may now be traced from terminal 292 through a conductor 294, limit switch 112, conductor 270, motor 24, and conductor 268 to terminal 288. The movement of rod 118 toward the left first causes the limit switch 114 to be closed without effect, and finally causes the limit switch 112 to be opened for automatically stopping the motor 24.

When the measuring instrument 10 and the recorder 12 are to be calibrated and put into service, the main power switch 170 is turned to the "on" position and the recorder 12 is allowed to warm up for about ten minutes. The battery switch 170 should be in the "on" position during calibration and testing. The test switch 278 should be in the test position for calibration and testing, in "load" position to return the movable sample support 18 to starting position, and in the "off" position between tests.

For calibration of elongation or stretch three machined steel gauge blocks (not shown) are provided which may be selectively set between the relatively stationary and movable sample supports 16 and 18. These blocks measure respectively one-half inch, three-fourths inch, and one and one-fourth inches. Since the supports 16 and 18 are one-fourth inch apart in the normal or starting position, the settings determined by these blocks represent travels or elongations of one-fourth inch, one-half inch and one inch respectively. By the use of the switch 278 the movable sample support 18 is adjusted to the exact distance from the relatively stationary sample support 16 which has been chosen, the selected measuring block being used to mechanically fix and determine the precise distance.

When the exact distance is set the switch 278 is placed in the "off" position, and by adjustment of the knob 234 the pen 230 is adjusted to the highest graduation on the chart, designated 100, this graduation being exactly ten inches to the right of the zero graduation on the chart. By use of the knob 234 the operator may provide full-scale setting for any selected movement of the movable sample support. The switch 278 is then placed in load position to return the movable sample support 18 to the normal or starting position and the pen 30 to the zero position.

For tensile calibration use is made of three sixteen ounce weights 297, 298 and 300. The first weight 297 includes a rod 302 for attaching the other two weights when desired. The rod 302 is connected to a nylon cable 304 which carries a hook 306 at its free end. For the purpose of calibration the hook 306 is temporarily secured under the magnet support 148 in a hole 308 which is provided for the purpose. The cable 304 is laid across the top plates 140 and 94 and over a pulley 309, and the weight is gently lowered until the cable is taut. The pulley 309 is supported from the back plate 52 through a rigid arm 310 and a stub shaft 312, the shaft 312 being rigidly carried by the arm.

For general testing it is found convenient to calibrate the instrument so that each one-tenth inch graduation of the vertical chart scale corresponds to one-half ounce of tension. Thus, sixteen ounces of tension would be translated into thirty-two of the one-tenth inch graduations or three and two-tenths inch. With the instrument warmed up and the battery switch 170 in the "on" position the chart 32 is adjusted by manual feeding through a knob (not shown) to bring one of the heavy horizontal lines of the chart into coincidence with the pen 30. The weight 297 is then applied as described and the calibration knob 234a is adjusted until the chart has been advanced in a downward direction exactly three and two-tenths inches from the no load point. The second weight 298 is then added to bring the chart to the six and four-tenths inch mark, and finally the weight 300 is added to bring the chart to the nine and six-tenths inch mark.

With the instrument warmed up and calibrated, the switches 170 and 296 and a function switch 314 in the "on" positions, and with the movable sample support 18 in the normal or starting position, a test may be made, using a sample which is cut to standard dimensions. The grooved top plates 140 and 94 serve as a convenient guide for assuring that the longitudinal edges of the sample will extend exactly in the direction of the tension which is to be applied. Care must be taken when placing the test sample on the supports neither to pre-stretch the sample nor to leave slack in it. Of the two errors slack is to be preferred because it may be measured by the horizontal track of the pen which occurs before the chart movement begins, and can then be subtracted from the indicated total elongation. To calibrate the percent elongation, the slack must be added to the two and five-tenths inch normal stretchable length of the sample. If a sample is pre-stretched, pre-loading occurs. The preload will be manifested by a vertical line along the zero elongation mark which is made by the pen before the movement of the sample support 18 begins. The pre-stretch, however, cannot be determined, and therefore an error is introduced for which no compensation can be made.

When the sample has been placed on the supports 16 and 18 and properly clamped in place by the magnets the switch 278 is placed in the test position. When the test strip has broken the chart will reverse itself, the pen track returning to the horizontal starting line. When the pen travel has been arrested by the opening of limit switch 114, the switch 278 is manually placed in the load position, and the pen 30 and the sample support 18 are mechanically returned to their initial positions. The switch 278 is then manually moved to the "off" position.

While certain preferred embodiments of the invention have been illustrated and described in detail, it is to be understood that changes may be made therein and the invention embodied in other structures. It is not, therefore, the intention to limit the patent to the specific construction illustrated, but to cover the invention broadly in whatever form its principles may be utilized.

I claim:

1. A measuring instrument for determining the tensile strength of weak webs and the relation of tension to the stretch thereof comprising, in combination, a pair of relatively movable sample supports, each support having a plane vertical face against which a sample end is clamped, a rounded snubbing corner around which the sample is wrapped and with which the sample is continuously engaged, and a horizontal supporting face having alternate ridges and grooves which extend in the direction of relative movement of the supports and terminate at the snubbing corners so that a stretchable sample area of predetermined length is defined which is coterminous with the outer ends of the ridges and grooves, and means responsive to movements of the supports for indicating coordinately the tension and stretch of the sample.

2. A measuring instrument as set forth in claim 1 in which the ridges and grooves are provided out to the side boundaries of the sample supports and serve as visual guides for the placing of the longitudinal edges of the sample in the direction of relative movement of the supports.

3. A measuring instrument for determining the tensile strength of weak webs and the relation of tension to stretch thereof comprising, in combination, relatively stationary and movable sample supports to which opposite ends of a sample are clamped with the length of the sample extending throughout a stretchable area in the direction of relative movement of the supports, means for mechanically driving the relatively movable support away from the relatively stationary support at a substantially predetermined uniform speed means positively operated in fixed proportion to such movement for indicating the stretch of the sample, a group of parallel, upstanding leaf springs mounting the relatively stationary support for substantially frictionless, inertia-free movement in response to tension transmitted from the relatively movable support through the sample, such movement varying with the tension exerted through the sample and being only a minute fraction of the movement of the relatively movable support, a strain gauge responsive to movement of the relatively stationary support, a tension indicating member, and means responsive to the strain gauge for imparting to the tension indicating member a movement which varies with the movement of the relatively stationary support but which is greatly amplified with respect thereto.

4. An instrument for testing and graphically recording the tensile strength of wet paper samples and the relation of tension to stretch thereof, comprising, in combination, relatively stationary and movable sample supports to which opposite ends of the sample are secured with the sample extending lengthwise through a stretchable area in the direction of relative movement of the supports, a group of parallel, upstanding leaf springs mounting the relatively stationary support for substantially frictionless, inertia free movement in response to tension transmitted from the relatively movable support through the sample, such movement varying with the tension exerted through the sample and being only a minute fraction of the movement of the relatively movable support, a strain gauge responsive to movement of the relatively stationary support, cooperative recording members consisting of a recording chart web and a recording stylus, means responsive to the strain gauge for feeding a first one of the recording members forward and backward in proportion to increase and decrease of tension, driving means operable to drive the relatively movable support away from the relatively stationary support through a predetermined distance and at a predetermined, uniform speed for progressively stretching the sample at a predetermined rate and applying tension through the relatively movable support and the sample to the relatively fixed support and the strain gauge, and a positive driving train responsive to said driving means and connected independently of the sample to drive the other of said recording members at right angles to the first through a predetermined distance, and at a rate bearing a fixed relation to the rate of movement of the movable support, for coordinately recording the stretch and tension of the sample before rupture and the tension at which rupture of the sample occurs.

5. An instrument for testing and graphically recording the tensile strength of wet paper samples and the relation of tension to stretch thereof, comprising, in combination, relatively stationary and movable sample supports to which opposite ends of the sample are secured with the sample extending lengthwise through a stretchable area in the direction of relative movement of the supports, a group of parallel, upstanding leaf springs mounting the relatively stationary support for substantially frictionless, inertia free movement in response to tension transmitted from the relatively movable support through the sample, such movement varying with the tension exerted through the sample and being only a minute fraction of the movement of the relatively movable support, a strain gauge responsive to movement of the relatively stationary support, a recording chart web, means responsive to the strain gauge for feeding the chart web forward and backward in proportion to increase and decrease of tension, respectively, driving means operable to drive the relatively movable support away from the relatively stationary support through a predetermined distance and at a predetermined, uniform speed for progressively stretching the sample at a predetermined rate and applying tension through the relatively movable support and the sample to the relatively fixed support and the strain gauge, a recording stylus cooperative with the chart and operable crosswise of the chart in a linear path, and a positive driving train responsive to said driving means and connected independently of the sample to drive the stylus through a predetermined distance across the chart and at a rate bearing a fixed relation to the rate of movement of the movable support, for coordinately recording the stretch and tension of the sample before rupture and the tension at which rupture of the sample occurs.

6. An instrument for testing and graphically recording the tensile strength of wet paper samples and the relation of tension to stretch thereof, comprising, in combination, relatively stationary and movable sample supports to which opposite ends of the sample are secured with the sample extending lengthwise through a stretchable area in the direction of relative movement of the supports, each sample support having a plane vertical face against which a sample end is clamped, a rounded snubbing corner around which the sample is wrapped and with which the sample is continuously engaged, and a horizontal supporting face having alternate ridges and grooves which extend in the direction of relative movement of the supports and terminate at the snubbing corners, means mounting the relatively stationary support for substantially frictionless, inertia-free movement in response to tension transmitted from the relatively movable support through the sample, such movement varying with the tension exerted through the sample and being only a minute fraction of the movement of the relatively movable support, a strain gauge responsive to movement of the relatively stationary support, cooperative recording members consisting of a recording chart web and a recording stylus, means responsive to the strain gauge for feeding a first one of the recording members forward and backward in proportion to increase and decrease of tension, driving means operable to drive the relatively movable support away from the relatively stationary support through a predetermined distance and at a predetermined, uniform speed for progressively stretching the sample at a predetermined rate and applying tension through the relatively movable support and the sample to the relatively fixed support and the strain gauge, and a positive driving train responsive to said driving means and connected independently of the sample to drive the other of said recording members at right angles to the first through a predetermined distance, and at a rate bearing a fixed relation to the rate of movement of the movable support, for coordinately recording the stretch and tension of the sample before rupture and the tension at which rupture of the sample occurs.

7. An instrument for testing and graphically recording the tensile strength of wet paper samples and the relation of tension to stretch thereof, comprising, in combination, relatively stationary and movable sample supports to which opposite ends of the sample are secured with the sample extending lengthwise through a stretchable area in the direction of relative movement of the supports, each sample support having a plane vertical face against which a sample end is clamped, a rounded snubbing corner around which the sample is wrapped and with which the sample is continuously engaged, and a horizontal supporting face having alternate ridges and grooves which extend in the direction of relative movement of the supports and terminate at the snubbing corners, a group of parallel, upstanding leaf springs mounting the relatively stationary support for substantially frictionless, inertia-free movement in response to tension transmitted from the relatively movable support through the sample, such movement varying with the tension exerted through the sample and being only a minute fraction of the movement of the relatively movable support, a strain gauge responsive to movement of the relatively stationary support, a recording chart web, means responsive to the strain gauge for feeding the chart web forward and backward in proportion to increase and decrease of tension, respectively, driving means operable to drive the relatively movable support away from the relatively stationary support through a predetermined distance and at a predetermined, uniform speed for progressively stretching the sample at a predetermined rate and applying tension through the relatively movable support and the sample to the relatively fixed support and the strain gauge, a recording stylus cooperative with the chart and operable crosswise of the chart in a linear path, and a positive driving train responsive to said driving means and connected independently of the sample to drive the stylus through a predetermined distance across the chart and at a rate bearing a fixed relation to the rate of movement of the movable support, for coordinately recording the stretch and tension of the sample before rupture and the tension at which rupture of the sample occurs.

8. An instrument for testing and graphically recording the tensile strength of wet paper samples and the relation of tension to stretch thereof, comprising, in combination, a pair of sample supports, one of which being a relatively stationary support and the other being a relatively movable support, each support having a plane vertical face against which a sample end is clamped, a rounded snubbing corner around which the sample is wrapped and with which the sample is continuously engaged, and a horizontal supporting face having alternate ridges and grooves which extend in the direction of relative movement of the supports and terminate at the snubbing corners, a group of parallel, upstanding leaf springs mounting the relatively stationary support for substantially frictionless, inertia-free movement in response to tension transmitted from the relatively movable support through the sample, such movement varying with the tension exerted through the sample and being only a minute fraction of the movement of the relatively movable support, a strain gauge responsive to movement of the relatively stationary support, driving means operable to drive the relatively movable support away from the relatively stationary support through a predetermined distance and at a predetermined, uniform speed for progressively stretching the sample at a predetermined rate and applying tension through the relatively movable support and the sample to the relatively stationary support and strain gauge, and means responsive to the strain gauge and to movement of the relatively movable support for indicating coordinately the tension and stretch of the sample.

References Cited in the file of this patent

UNITED STATES PATENTS

| | | |
|---|---|---|
| 1,327,393 | Jury | Jan. 6, 1920 |
| 2,587,628 | King | Mar. 4, 1952 |
| 2,708,362 | Jordan | May 17, 1955 |
| 2,756,590 | Clifford | July 31, 1956 |